United States Patent [19]
Lee

[11] Patent Number: 6,092,386
[45] Date of Patent: Jul. 25, 2000

[54] AIR CONDITIONER

[75] Inventor: Joong-Hee Lee, Ansan, Rep. of Korea

[73] Assignee: SamSung Electronics Co., Ltd., Suwon, Rep. of Korea

[21] Appl. No.: 09/240,879

[22] Filed: Feb. 1, 1999

[30] Foreign Application Priority Data

Apr. 1, 1998 [KR] Rep. of Korea ..................... 98-11503

[51] Int. Cl.[7] ................................................. F25D 17/04
[52] U.S. Cl. .............................................. 62/317; 62/298
[58] Field of Search ........................... 62/317, 298, 259.1

[56] References Cited

U.S. PATENT DOCUMENTS 1,949,379 2/1934 Sargent .
2,081,553 5/1937 Neeson .
2,105,205 1/1938 Steinfield et al. .

*Primary Examiner*—Henry Bennett
*Assistant Examiner*—Melvin Jones
*Attorney, Agent, or Firm*—Robert E. Bushnell, Esq.

[57] ABSTRACT

An air conditioner having a suction grille member for opening and closing suction inlets of a main body and at least one pair of electric dust collectors installed behind the suction grille member for convenient attachment or detachment for cleaning, the air conditioner comprising: a suction grille member coupled to the main body by means of a plurality of hinge parts for being horizontally opened or closed in the opening and closing method; and at least one accommodating member fixed behind the suction grille member for accommodating and supporting the electric dust collectors as soon as the suction grille member opens, whereby the electric dust collectors are pulled out to a side for cleaning and are returned to their original positions in convenience.

6 Claims, 6 Drawing Sheets

AIR CONDITIONER

BACKGROUND OF THE INVENTION

1. Field of the Invention

The present invention relates to an air conditioner, and more particularly to an air conditioner with an improved attachment method of electric dust collectors mounted at suction inlets in a lower portion thereof for convenient assembly and disassembly.

2. Description of the Prior Art

A conventional air conditioner, as shown in FIGS. 1, 2 and 3, is provided with an attachable and detachable suction grille member 20 having a plurality of suction inlets 21 at a lower portion of the front part of a main body 10 for sucking room air, discharge outlets 30 at upper portion of the front part of the main body 10 for discharging out the room air, and a plurality of horizontal and vertical blades 40 and 50 arranged in rows for changing directions of the discharging the room air to be blown toward a desired position of the room.

The air conditioner is also provided with a control part 60 at a central portion of the front part of the main body 10, air blow means 70 in the middle of the main body 10 for forcibly sucking the room air inside through the suction grille member 20 and for discharging the air into the room through the discharge outlets 30, and a plurality of electric dust collectors 80 in easy attachment and detachment at a lower portion of the main body 10 for filtering dust contained in the air sucked through the suction grille member 20.

The air blow means 70 consists of a motor 71 to be driven by transmission of power, an air blow fan 73 to be rotated along a motor shaft 72 by the motor 71, a duct 74 for guiding the air flow generated by the air blow fan 73 toward predetermined positions.

The electric dust collectors 80 are in a large plate type which enables the electric dust collectors 80 to be mounted on a plurality of fixed rails 11 horizontally arranged in a predetermined vertical interval at both side walls in the lower portion of the main body 10.

However, there is a problem in the conventional air conditioner in that the electric dust collectors 80 are mounted on the fixed rails 11 at both side walls of the main body 10 to be horizontally pulled out, as shown in FIG. 3 and to be attached in a reverse way, as shown in FIG. 2. In addition, the above-mentioned plate type of the electric dust collectors 80 is bulky and heavy, thereby giving a user troubles in handling and cleaning and in readily attaching and detaching out of the fixed rails 11.

SUMMARY OF THE INVENTION

The present invention is presented to solve the aforementioned problems and it is an object of the present invention to provide an air conditioner having at least one pair of dust collectors in a scroll type with a smaller volume and weight, and for horizontally moving the electric dust collectors to be vertically accumulated and horizontally arranged in parallel, when the suction grille member opens or closes, whereby the user can conveniently takes out the electric dust collectors for cleaning.

In order to achieve the object of the present invention, there is provided an air conditioner having suction grille member for opening and closing suction inlets of a main body and at least one pair of electric dust collectors installed behind the suction grille member for convenient attachment or detachment for cleaning, the air conditioner comprising:

a suction grille member coupled to the main body by means of a plurality of hinge parts for being horizontally opened or closed in the opening and closing method; and at least one accommodating member fixed behind the suction grille member for accommodating and supporting the electric dust collectors as soon as the suction grille member opens.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Figure 1:
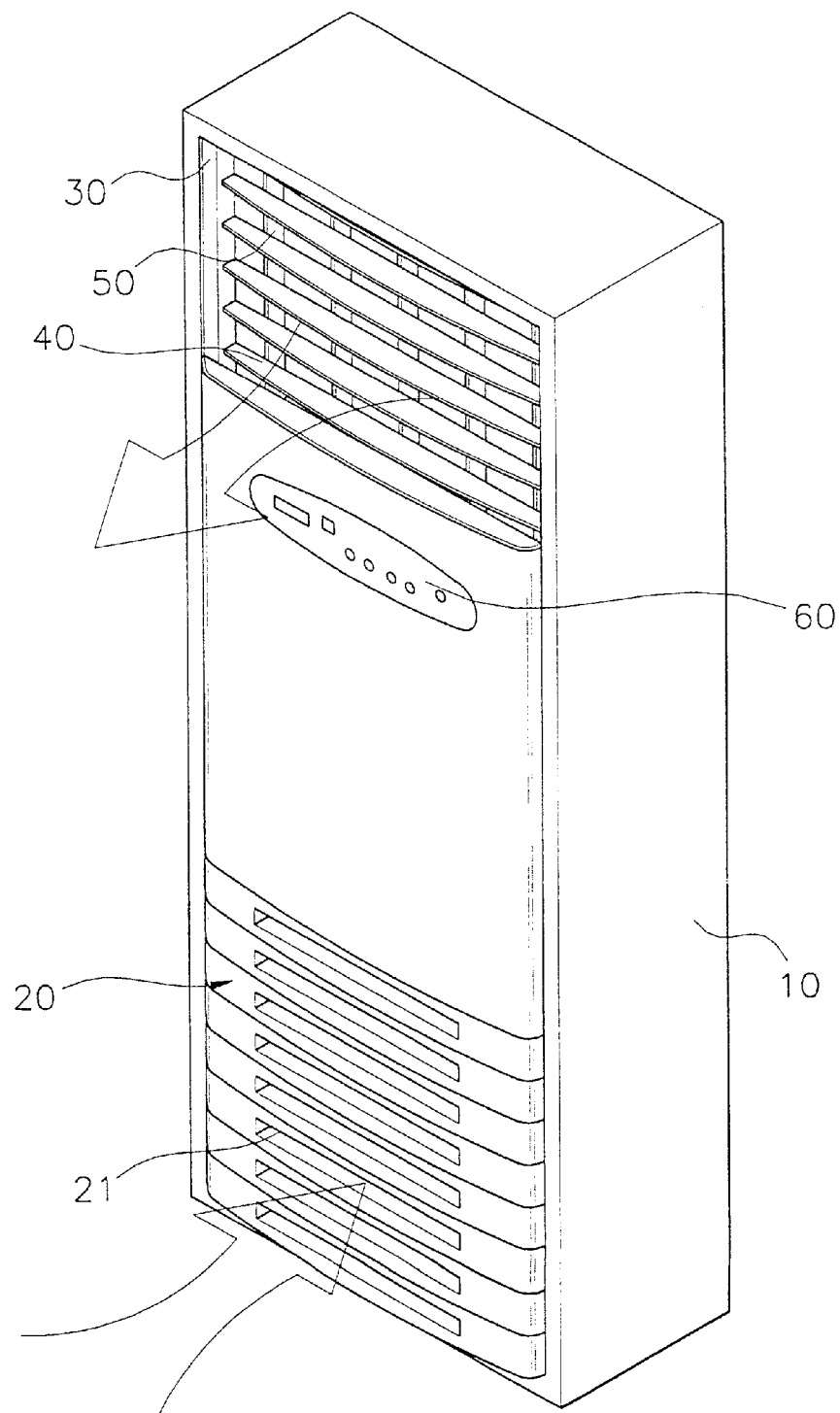
FIG. 1 is a perspective view of the external appearance of a conventional air conditioner.
Figure 2:
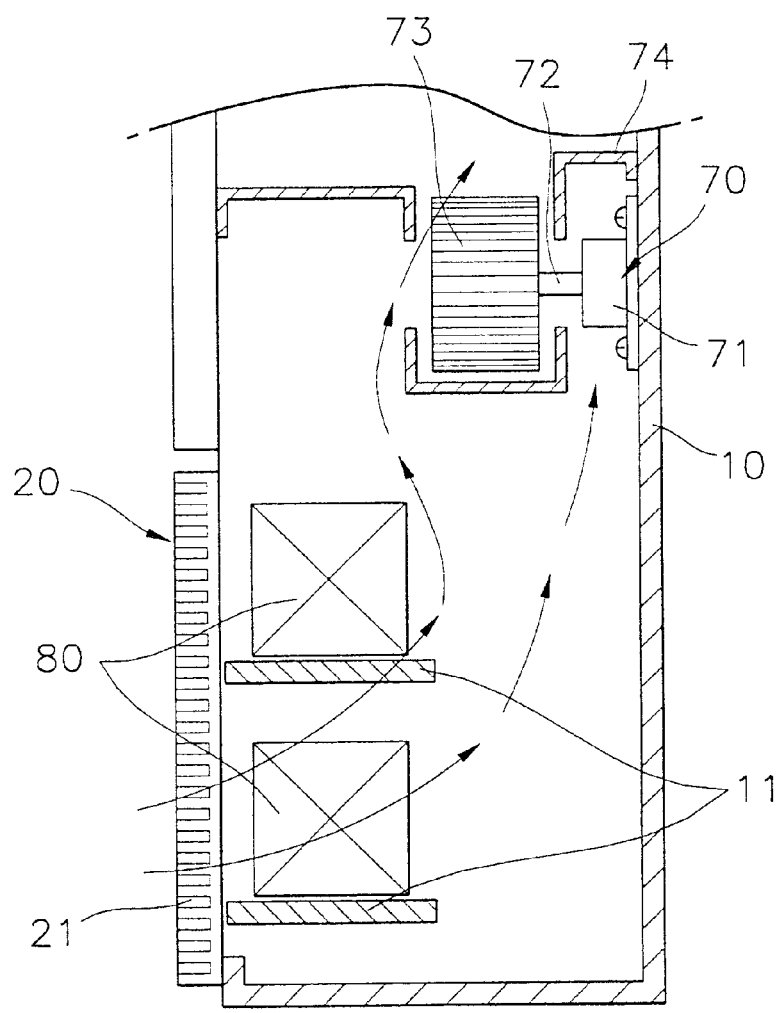
FIG. 2 is a brief lateral view for illustrating an assembled state of conventional electric dust collectors.
Figure 3:
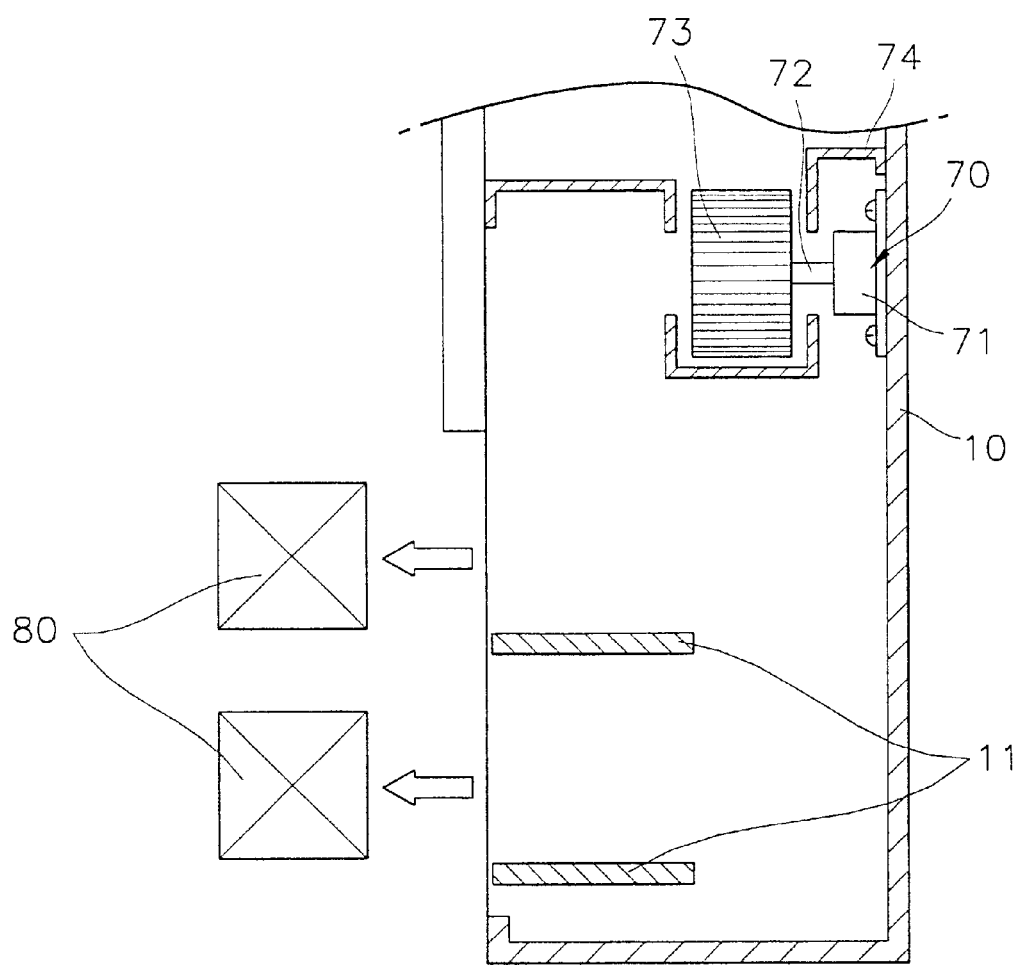
FIG. 3 is a brief lateral view for illustrating a disassembled state of conventional electric dust collectors.
Figure 4:
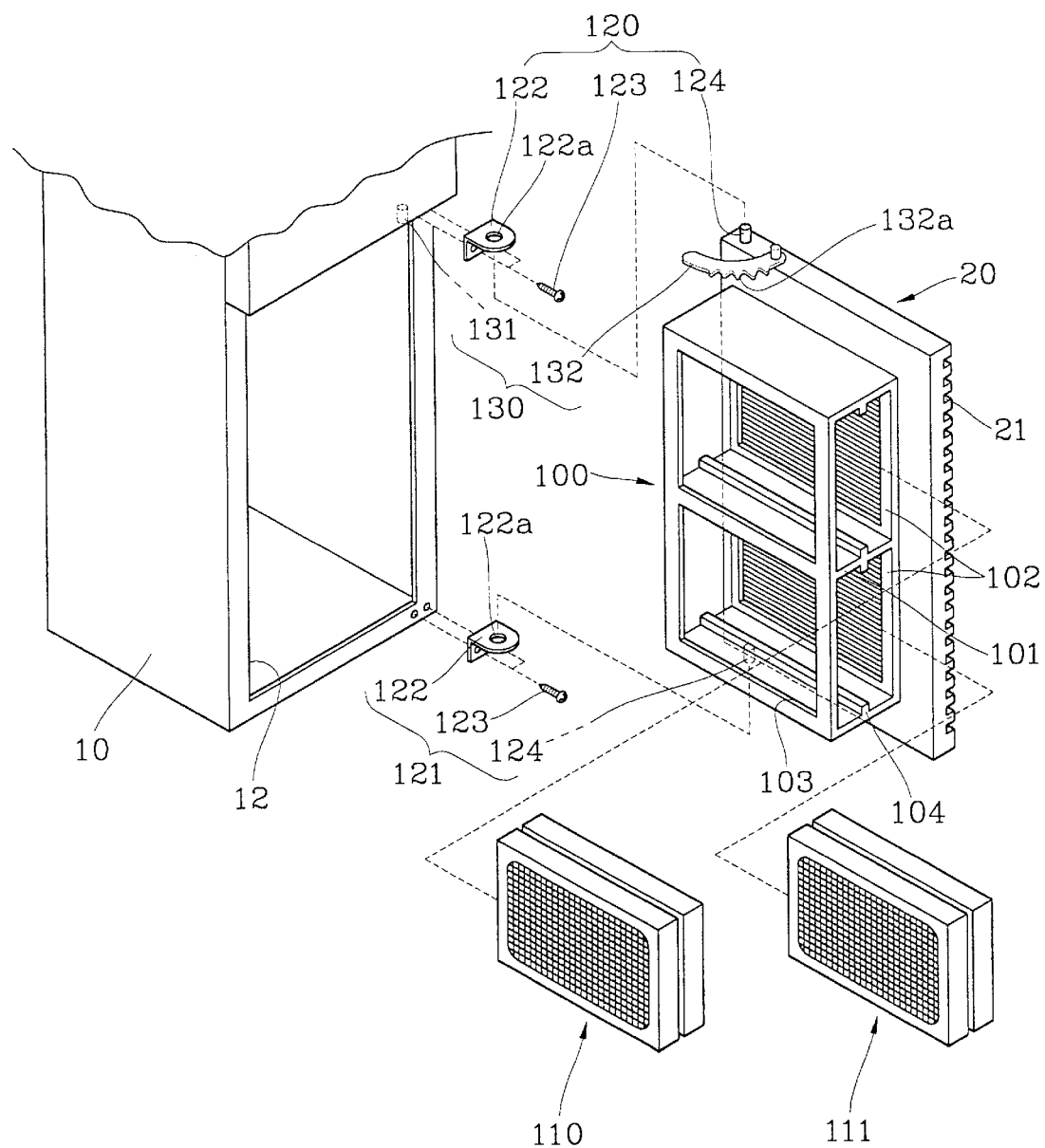
FIG. 4 is an analyzed perspective view for illustrating electric dust collectors in accordance with the present invention.
Figure 5:
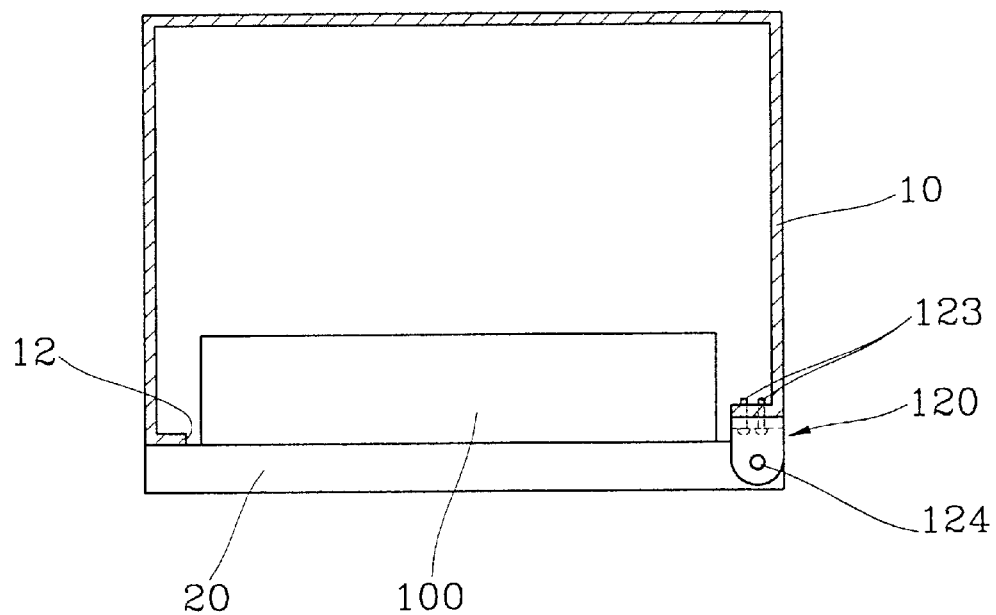
FIG. 5 is a plane sectional view for illustrating an assembled state of electric dust collectors in accordance with the present invention.

An embodiment of the present invention will be described hereinafter in detail with reference to FIGS. 4, 5 and 6. Throughout the drawings, like symbols and reference numerals are used for designation of like or equivalent parts or portions, and redundant description will be omitted for simplicity of illustration and explanation.

Electric dust collectors of the present invention include an accommodating member 100 fixed for being connected with a plurality of suction inlets 21 formed at the suction grille member 20, at least one pair of electric dust collectors in a scroll type having a smaller volume and weight for being inserted into the accommodating member 100 through an opening 102 formed at a side of the accommodating member 100 for convenient attachment and detachment, a plurality of hinge parts 120, 121 installed for opening or closing the suction grille member 20 in the opening and closing method between one end of the suction grille member 20 and one end of the suction inlets 21, and a stopper part disposed at a predetermined position of the main body 10 and suction grille member 20 for convenient attachment or detachment of the electric dust collectors 110 and 111 without disturbance of the suction grille member 20 when it opens at a predetermined angle.

At this time, the accommodating member 100 includes a vertical opening 102 centering a middle wall 101 formed at upper and lower portions of one side for accumulating the electric dust collectors in their assembly and disassembly, a horizontal air flow groove 103 formed at the front and rear portions except all edges for passing outside the air sucked through the suction inlets 21 of the suction grille member 20 and gap-maintaining ribs 104 protruded in the vertical correspondence at an internal and longitudinal wall centering the middle wall 101 for refraining the electric dust collectors 110 and 111 from contacting each other when they are horizontally arranged in parallel inside the accommodating member 100.

The electric dust collectors 110 are a scroll type having a smaller volume and weight arranged in parallel in the accommodating member 100 through the vertical opening 102. Even 3 pairs of electric dust collectors can be installed, differently from the embodiment shown in FIG. 4.

The hinge parts 120, 121 include a pair of fixing plates 122 assembled to face each other at top and bottom portions of one end to the suction part 12 of the main body 10 by a plurality of fastening screws 123, and a hinge shaft 124 protruded to be inserted into a hinge hole 122a formed on the horizontal surface of the fixing plates positioned at the one end of the respective upper and lower surfaces of the suction grille members 20.

The stopper part 130 includes a stopping shaft 131 vertically installed inside the minimum diameter adjacent to the hinge part 120 on the upper surface of the suction inlets 12 of the main body 10, and a curbed stopper lever 132 disposed inside the minimum diameter adjacent to the hinge part 120 on the upper surface of the suction grille member 20 for controlling and fixing an open angle of the suction grille member 20 in a plurality of steps by being contacted to the stopper shaft 131 in elasticity. At this time, the stopper lever 132 has a plurality of stopping teeth 132a formed at a surface correspondingly contacted to the stopping shaft 131 in a predetermined longitudinal interval.

Next, the operation and effects of the present invention are described. When the air blow means (not shown) equipped in the main body 10 is driven by starting the air conditioner, room air is forcibly sucked into the main body 10 through the suction inlets 21 of the suction grille member 20 mounted at the suction part 12 of the main body 10, and, at the same time, the air is discharged out to the room through the discharge outlets (not shown) formed at upper portion of the main body 10. The cycle of sucking and discharging air is repeated continuously.

At this time, the air sucked into the main body 10 through the suction holes 21 of the suction grille member 20 passes between a discharge plate (not shown) and a charge plate (not shown) of the electric dust collectors 110, 111 arranged in a parallel at the upper and lower sides by means of the accommodating member 100 fixed at the rear portion of the suction grille member 20, thereby removing the dust contained in the air and purifying the air.

The electric dust collectors 110, 111 are operated by the high voltage simultaneously or a few seconds before or after the air blow means is driven by the supply of power. At this time, the discharge plate (not shown) generates discharge waves, breaks the dust contained in the air passing between the discharge plate (not shown) and the charge plate (not shown) into fine particles and filters the dust by being stuck onto a negatively (minus) charged plate (not shown), thereby passing only clean air.

Figure 6:
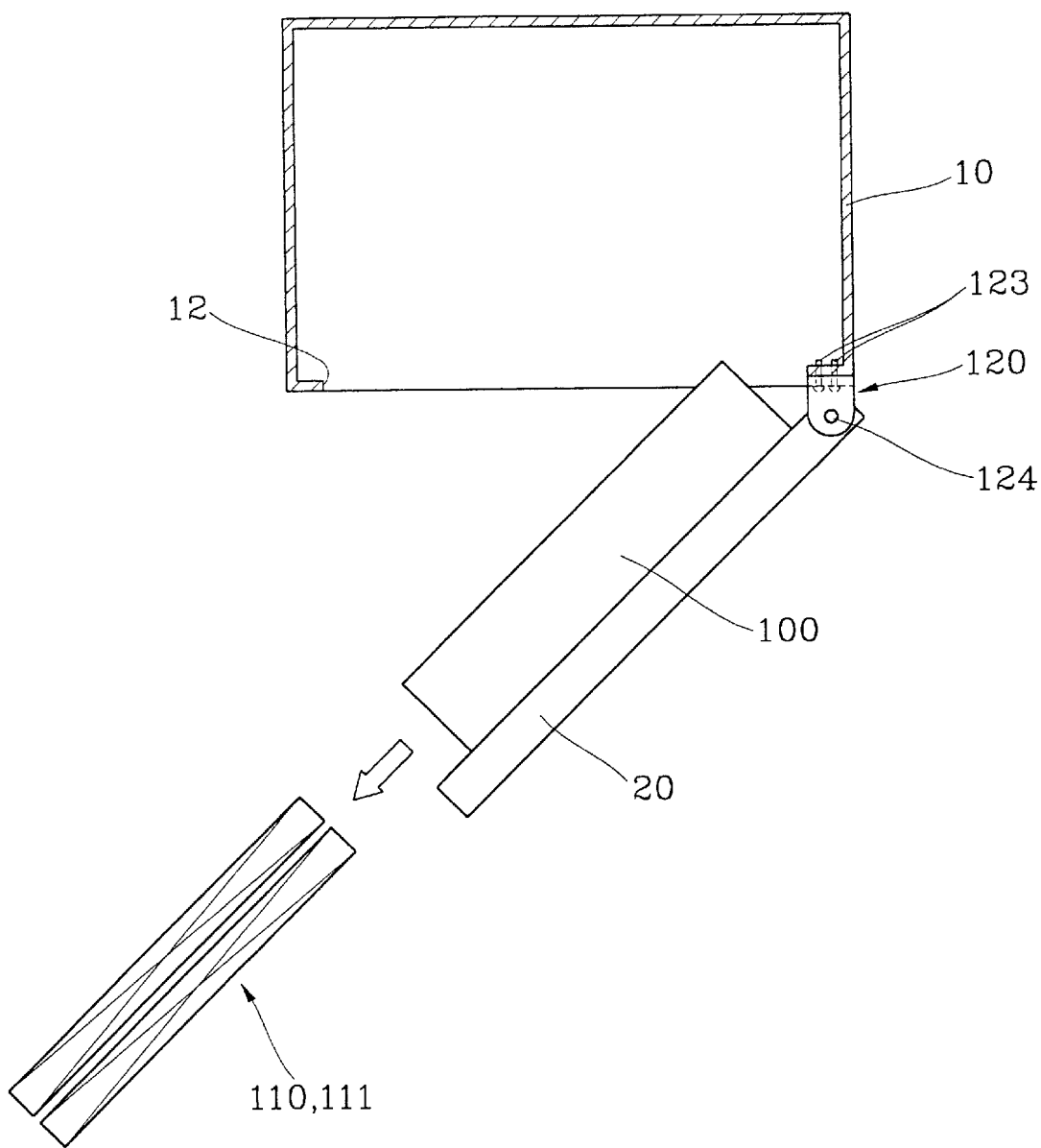
FIG. 6 is a plane sectional view for illustrating the disassembled state of electric dust collectors in accordance with the present invention.

Next, to detach and clean the electric dust collectors 110 and 111, the user holds and pulls one end of the suction grille member 20 (the left side of the FIG. 5) to open in the opening and closing method the suction grille member 20 centered by the hinge parts 120 and 121 connected between the other end of the suction grille member 20 and the main body 10, as shown in FIG. 6. Then, the suction grille member 20 is opened at a predetermined angle from the suction part 12 of the main body 10 by being contacted in elasticity of the stopping shaft 131 and stopping lever 132 of the stopping part 130 installed in the minimum diameter adjacent to the hinge part 120 on the upper end of the main body 10 and the suction grille 20 and at the same time is stopped at a predetermined position without shaking. Accordingly, the accommodating member 100 fixed behind the suction grille member 20 opens out and, at the same time, the vertical opening 102 formed at one side of the accommodating member 100 opens out.

At this time, the user pulled out to a side through the opening 102 the electric dust collectors 110 and 111 placed in parallel and vertically and horizontally centered by the middle wall 101 in the accommodating member 100, whereby the electric dust collectors 110 and 111 are conveniently detached without touching the suction part 12 to allow the user to clean out the dust accumulated at the electric dust collectors 110 and 111.

Furthermore, to attach the electric dust collectors 110 and 111 to the original positions, the user inserts the electric dust collectors 110 and 111 through the upper opening 102 of the accommodating member 100 in reverse to the above-described sequence and then pushes the suction grille member 20 to the main body 10.

At this time, one side of the suction grille member 20 rotates at the hinge parts 120 and 121 connected to the other side thereof and the main body in the opening and closing method to attach closely to the edges of the suction part 12 of the main body 10.

Therefore, there are advantages of the present invention in that the electric dust collectors 110 and 111 are in a scroll type featuring a smaller volume and weight, and in that the suction grille member 20 is constructed in the opening and closing method which enables the electric dust collectors to be accumulated behind the suction grille member 20 and, at the same time, to be accommodated in parallel, whereby the electric dust collectors 110 and 111 are pulled out to a side for cleaning and are returned to their original positions in convenience.

What is claimed is:

1. An air conditioner having a suction grille member for opening and closing suction inlets of a main body and at least one pair of electric dust collectors installed behind the suction grille member for convenient attachment or detachment for cleaning, the air conditioner comprising:

a suction grille member coupled to the main body by means of a plurality of hinge parts for being horizontally opened or closed in an opening and closing method; and at least one accommodating member fixed behind the suction grille member for accommodating and supporting the electric dust collectors as soon as the suction grille member opens.

2. The air conditioner, as defined in claim 1, wherein an opening is formed at one side of the accommodating member for inserting into and pulling out the electric dust collectors to one side in assembly and disassembly when the suction grille member opens.

3. The air conditioner, as defined in claim 1, wherein a hinge part includes a pair of fixing plates assembled to face each other at top and bottom portions of one end to the suction part and a hinge shaft protruded for being inserted into a hinge hole formed on the fixing plates positioned at the one end of the respective upper and lower surfaces of the suction grille members.

4. The air conditioner, as defined in claim 1, wherein a stopper part is disposed at a predetermined position of the suction grille member for convenient attachment or detachment of the electric dust collectors without disturbance when it opens at a predetermined angle.

5. The air conditioner, as defined in claim 4, wherein a stopper part includes a stopping shaft vertically installed inside the minimum diameter adjacent to the hinge part on the upper surface of the suction inlets of the main body and a curbed stopper lever disposed inside the minimum diameter adjacent to the hinge part on the upper surface of the suction grille member for controlling and fixing an open angle of the suction grille member in a plurality of steps by being contacted to the stopper shaft in elastic force.

6. The air conditioner, as defined in claim 5, wherein a stopper lever has a plurality of stopping grooves formed at a surface correspondingly contacted to the stopping shaft in a predetermined longitudinal interval.

* * * * *